US005896288A

United States Patent [19]

Lecheler et al.

[11] Patent Number: 5,896,288

[45] Date of Patent: Apr. 20, 1999

[54] CONVERTER HOUSING

[75] Inventors: Reinhard Lecheler, Neuburg an der Donau; Theodor Kiermeier, Munich, both of Germany

[73] Assignee: Patent-Treuhand-Gesellschaft fuer elektrische Gluehlampen mbH, Munich, Germany

[21] Appl. No.: 08/825,044

[22] Filed: Mar. 27, 1997

[30] Foreign Application Priority Data

Mar. 28, 1996 [DE] Germany .......................... 196 12 402

[51] Int. Cl.[6] .............................. H02M 7/44; F21S 1/10; F21L 7/00

[52] U.S. Cl. .......................... 363/146; 362/431; 362/199

[58] Field of Search .................................... 361/736, 782; 174/50; 362/265, 267, 183, 186, 199, 374, 431; D26/28, 34, 35, 46, 50

[56] References Cited

U.S. PATENT DOCUMENTS

| | | | |
|---|---|---|---|
| D. 346,237 | 4/1994 | Schreder | 362/431 |
| 4,755,920 | 7/1988 | Tinley | 362/306 |
| 5,599,091 | 2/1997 | Kira | 362/269 |
| 5,604,406 | 2/1997 | Gaus | 315/56 |

*Primary Examiner*—Peter S. Wong
*Assistant Examiner*—Rajnikant B. Patel
*Attorney, Agent, or Firm*—Carlo S. Bessone

[57] ABSTRACT

The present invention relates to a converter housing 10, in particular for an electronic converter for halogen lamps. The converter housing 10 in this case has a basic housing body 12 for holding electronic components, and a terminating element 14 with a cable support for supporting at least one electric connecting cable. The basic housing body 12 and the terminating element 14 are arranged perpendicular to one another in this case. At the end opposite the terminating element 14, the basic housing body 12 additionally has an end face 18 rounded off towards its underside.

11 Claims, 6 Drawing Sheets

CONVERTER HOUSING

FIELD OF THE INVENTION

The present invention relates to a converter housing, in particular for an electronic converter for halogen lamps, having a basic housing body for holding electronic components, and a terminating element with a cable support for supporting at least one electrical connecting cable.

BACKGROUND OF THE INVENTION

There is a need for independent electronic converters in order to be able, for example, to operate halogen lamps with the conventional mains supply. Two types of converter are normally used for this purpose. These are, on the one hand, converters having terminals for the cabling on the supply side and lamp side which are spatially separated and situated opposite one another and, on the other hand, converters in which the terminals for the cabling on the supply side and lamp side are in a close spatial relationship and arranged next to one another. Owing to these different designs of the two types of converter, they also differ in the design of their housings. In the former case, the converter housing has two cover caps which each cover one terminal and are arranged at opposite ends of the housing. In the latter case, just one cover cap conceals both terminals, arranged close to one another spatially, at one end of the housing.

It is true that known converter housings with two cover caps on the one hand have sufficient space for mechanized and cost effective mounting of the electronic components and for easy mounting of the connecting cables with a diameter of up to 11 mm which are normally used in building installation. However, on the other hand because of their dimensions (length: 152 to 185 mm, width: 40 to 44 mm, height: 32 to 35 mm) and their elongated cuboid housing shape, it is impossible to insert these converter housings through, for example, ceiling cutouts of built-in luminaires. This holds, in particular, when the false ceiling is of low height, the spacing between the solid ceiling and the suspended ceiling normally being approximately 60 mm. The ceiling cutouts of the built-in luminaires normally have a diameter of approximately 55 mm.

Converter housings for converters with a terminal for the cabling on the supply side and lamp side can be designed to be shorter by approximately 40 mm by omitting one terminal while maintaining the same board area for the electronic components. In addition, it is possible to insert some of these known converters into low false ceilings. The types of converter housing mentioned in Table 1 may be mentioned here by way of example.

TABLE 1

Dimensions and other parameters of known converter housings (EREA Ereatronic 60/L, OMNITRONIX OMN60LT, nobile - 110 D, TRASFITALIA Mouse 105 DR)

| | EREA | OMNITRONIX | nobile | TRASFITALIA |
|---|---|---|---|---|
| Dimensions [mm] | 127 × 41 × 36 | 123 × 36 × 28 | 123 × 36 × 25 | 122 × 38 × 28 |
| Insertable into false ceiling* | no | yes | yes | no |
| Effective board area [cm$^2$] | 26 | 27 | 26 | 27 |
| Effective housing volume [cm$^3$] | 89 | 67 | 60 | 70 |
| Suitable for cables with max Ø [mm] | 6 | 6 | 6–7 | 6 |

*free height of the false ceiling: 60 mm; diameter of the ceiling cutout: 55 mm

The converter housings described in Table 1 in accordance with the prior art have various disadvantages, however. For one thing, the effective board areas and the effective housing volumes are very small. The electronic components therefore have to be mounted very closely next to one another or even above one another. It is therefore no longer possible to mount the components by machine. However, manual mounting of the components leads to a higher fault probability and higher mounting costs. In addition, the strain reliefs of the known housings are designed only for connecting cables with a diameter of up to a maximum of 7 mm. However, as already mentioned, the cables which are customary in building installation have an outside diameter of up to 11 mm. Because of the cuboid construction of these known converter housings, it is likewise impossible to retrofit them in false ceilings via the prepared ceiling cutouts of built-in luminaires.

SUMMARY OF THE INVENTION

It is therefore the object of the present invention to provide a converter housing of the type mentioned at the beginning which in the case of prescribed mounting properties such as, for example, installation via the ceiling cutout of a built-in luminaire, ensures a larger effective board area and/or a higher effective housing volume.

In the converter housing according to the invention, a basic housing body and a terminating element are arranged perpendicularly to one another. The perpendicular arrangement of these two elements ensures that a larger effective board area is produced by accommodating boards of larger area, and that a higher effective housing volume is produced. The basic housing body in this case has at the end opposite the terminating element an end face rounded off towards its underside. Rounding off this end of the basic housing body ensures that the converter housing or the converter can be mounted in a conventional ceiling cutout of a built-in luminaire in the case of low false ceilings.

In an advantageous refinement of the invention, the basic housing body is essentially constructed in the shape of a cylinder. In addition, two mutually parallel, flat surfaces can be constructed as base element and ceiling element parallel to the cylinder axis of the basic housing body. Owing to the cylindrical basic shape of the basic housing body, the effective board area and/or the housing volume is further increased.

In a further advantageous refinement of the invention, the terminating element has side walls which are rounded off towards its underside and/or cambered outwards. This geometrical construction of the side walls of the terminating element further simplifies the mounting of the converter housing according to the invention via small ceiling openings or the like.

In a further advantageous refinement of the converter housing according to the invention, the latter has a sealing cap for covering a cable compartment formed by the terminating element. In this case, this sealing cap can be rounded off in the direction of the underside of the terminating element and/or is constructed with a camber. This special geometrical construction of the sealing cap likewise serves the purpose of easy retrofitting of the converter housing according to the invention.

The same holds for a further advantageous refinement of the invention in which the basic housing body is constructed rounded-off at at least one transition between at least one side wall of the basic housing body and the base and/or ceiling element. The transition between the end face 18 and the base and/or ceiling element can also be constructed rounded-off.

Cambering the side walls of the basic housing body outwards advantageously effects a further increase in the effective housing volume and thus in the board area to be accommodated in the converter housing.

In a further advantageous refinement of the converter housing according to the invention, a groove is constructed in the base element of the basic housing body, which groove extends beyond the base element into the underside of the terminating element. A supply-side electric connecting cable can advantageously be laid into this groove, the result being further to ease the insertion of the converter or of the converter housing during mounting in, for example, false ceilings.

BRIEF DESCRIPTION OF THE DRAWINGS

Further details, features and advantages of the invention emerge from the following description of an exemplary embodiment represented in the drawing, in which.

BEST MODE FOR CARRYING OUT THE INVENTION

Figure 1:
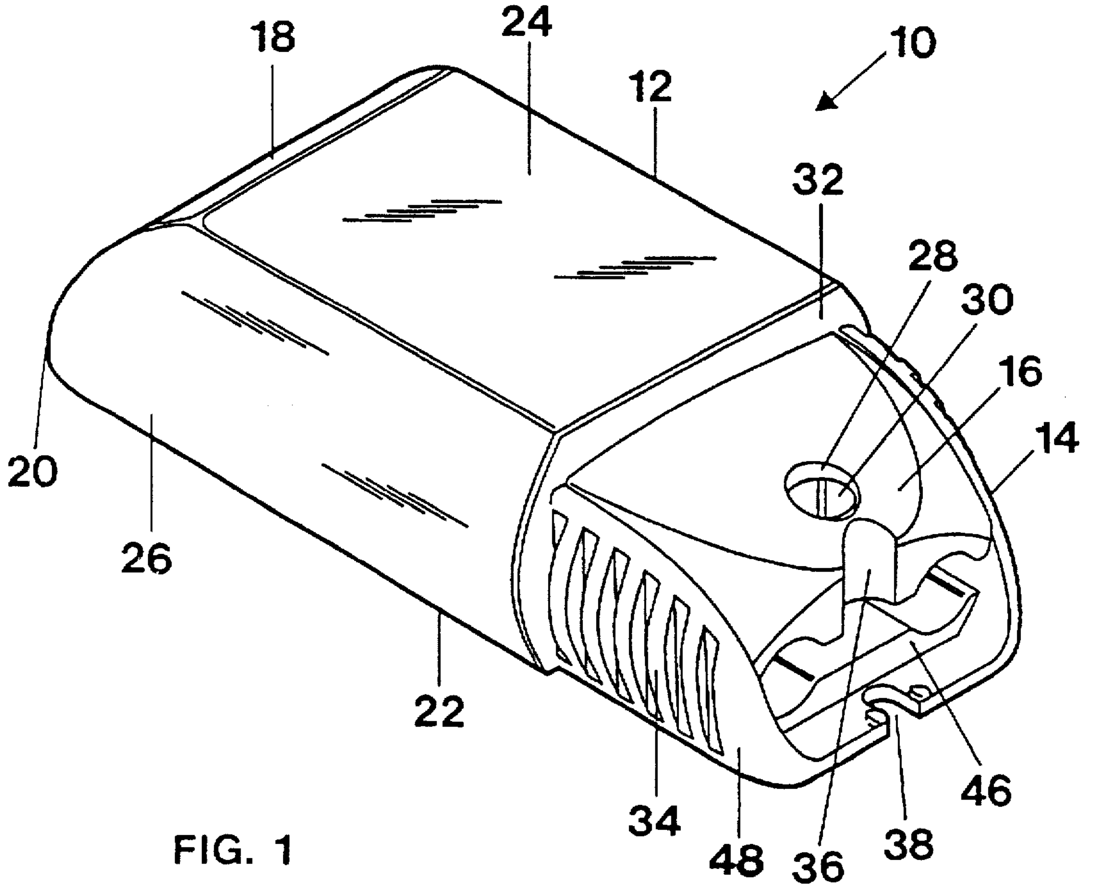
FIG. 1 shows an overall perspective representation of a converter housing according to the invention.

A converter housing 10 represented in an overall perspective representation in FIG. 1 has a basic housing body 12, a terminating element 14 and a sealing cap 16. The basic housing body 12 and the terminating element 14 are in this case arranged perpendicular to one another. It is seen that an end face 18 rounded off towards its underside is constructed on that end of the basic housing body 12 opposite the terminating element 14. Overall, the basic housing body 12 has a geometry which is essentially cylindrical. In this case, two mutually parallel, flat surfaces are constructed as base element and ceiling element 22 and 24 parallel to the cylinder axis of the basic housing body.

The basic housing body 12, which serves to hold electronic components, has an opening at the end opposite the end face 18 for receiving the terminating element 14. In this arrangement, a cutout partition 32 connects the basic housing body 12 to the terminating element 14, which has a smaller diameter. The basic housing body 12 and the terminating element 14 can in this case be detachably connected via a latching connection (not represented).

A printed circuit board and further electronic components (which are likewise not represented) are arranged in the interior of the housing volume formed by the basic housing body 12 and the terminating element 14.

It is seen, furthermore, that the terminating element 14 has a cable support 46 for supporting at least one electric connecting cable. In addition, the terminating element 14 has side walls 48 which are rounded off towards its underside and/or cambered outwards. The side walls 48 are constructed with ribs in the exemplary embodiment.

Figure 3:
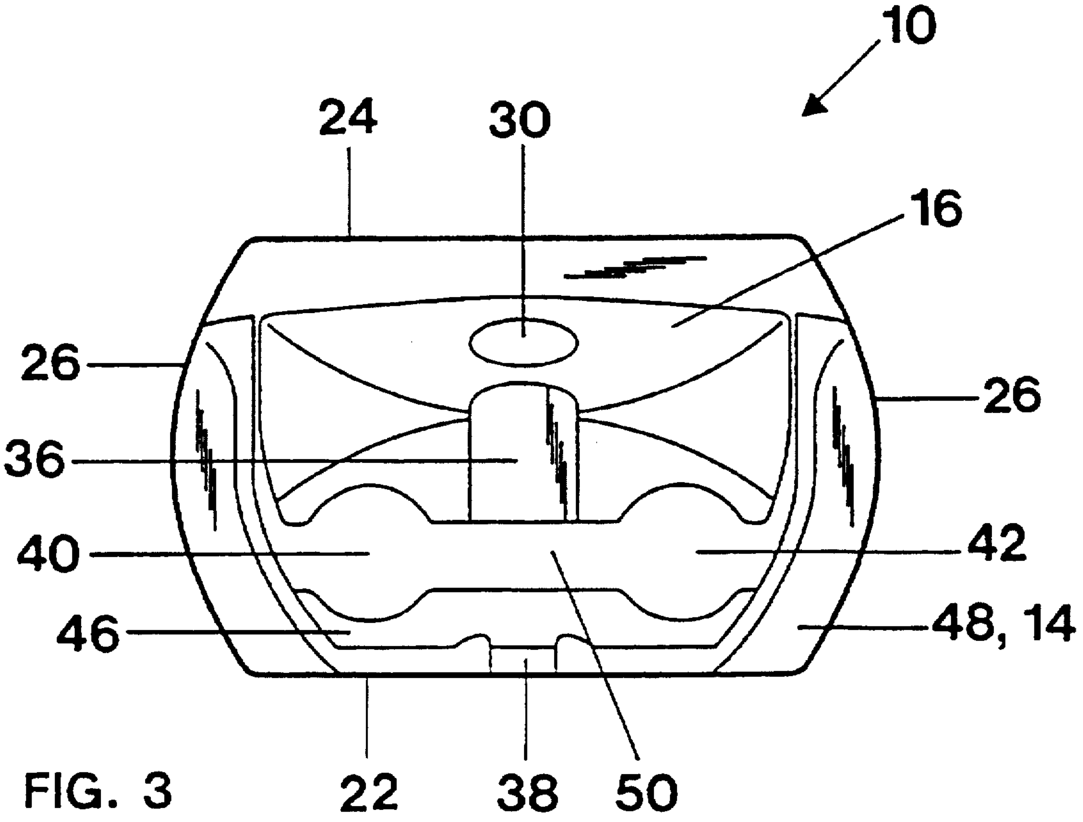
FIG. 3 shows a diagrammatically represented front view of the converter housing according to the invention.

The sealing cap 16 serves to cover the cable compartment 50 formed by the terminating element 14 (see also FIG. 3). In this arrangement, the sealing cap 16 is rounded off in the direction of the underside of the terminating element 14 and/or is constructed with a camber. The sealing cap 16 has a first recess 36 at the end averted from the basic housing body 12. This first recess 36 corresponds to a corresponding second recess 38 on the underside of the terminating element 14. These two corresponding recesses 36, 38 serve to ease the fastening of the converter housing 10 via a fastening element (not represented) to, for example, a ceiling of a building or a false ceiling. Furthermore, an opening 28 is constructed in the sealing cap 16 to receive a fastening element 30. The sealing cap 16 is detachably fastened to the terminating element 14 via the fastening element 30, which engages in a corresponding receiving opening (not represented) of the terminating element. However, the sealing cap 16 does not serve only to cover the cable compartment 50 formed by the terminating element 14, but also to relieve the strain on the electric connecting cable. For this purpose, the sealing cap 16 is constructed to pivot on the terminating element 14 and thereby permits the simultaneous relief of strain on a cable with an outside diameter of 8 mm (for example silicone cable for lamp wiring) and of a cable with an outside diameter of 11 mm (for example NYM cable in domestic electrical installation). Fastening the sealing cap 16 via only a central fastening element 30 additionally produces an advantage in terms of mounting and costs.

The housing geometry represented in the exemplary embodiment yields the housing parameters set forth by way of example in Table 2.

TABLE 2

| Dimensions and other parameters of the converter housing in accordance with the exemplary embodiment | Exemplary embodiment |
|---|---|
| Dimensions [mm] | 108 × 52 × 33 |
| Insertable in false ceiling* | yes |
| Effective board area [$cm^2$] | 31[1] |
| Effective housing volume [$cm^3$] | 90 |
| Suitable for cables with max Ø [mm] | 11 |

*free height of the false ceiling: 60 mm; diameter of the ceiling cutout: 55 mm

The parameters specified in Table 2 clearly indicate that despite a shorter length the converter housing 10 has a plainly increased effective board area as well as a plainly increased effective housing volume. In addition, the converter housing 10 can be inserted into a false ceiling and is suitable for cables with a cable diameter of a maximum of 11 mm.

Figure 2:
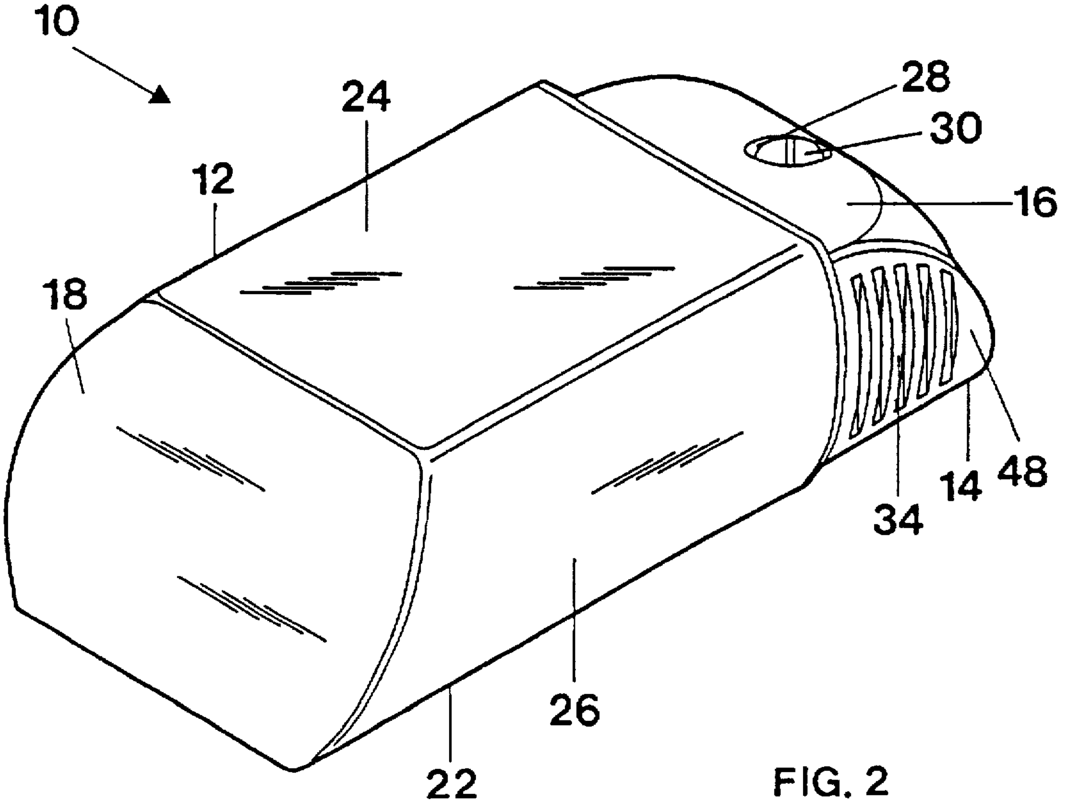
FIG. 2 shows a further overall perspective representation of the converter housing according to the invention.

FIG. 2 shows a further overall perspective representation of the converter housing 10. It is seen that the end face 18 is constructed rounded-off towards the underside, that is to say towards the base element 22 of the basic housing body 12. The side walls 26 arranged between the base element 22 and the ceiling element 24 of the basic housing body 12 are constructed cambered outwards. It is further to be seen that both the side walls 48 of the terminating element 14 and the sealing cap 16 are constructed rounded-off towards the underside of the terminating element 14. The side walls 48 in this case have ribs 34 which ensure a simplified and reliable handing of the terminating element 14.

The cambers of the end face 18 of the basic body and of the sealing cap 16, as well as the bent profile of the side walls 48 of the terminating element 14 are matched exactly to inserting the converter housing 10 into a false ceiling. The false ceiling in this case has circular ceiling cutouts with a diameter of approximately 55 mm. The cylindrical body on which the shape of the converter housing is based has a diameter of 52 mm.

FIG. 3 shows a front view of the converter housing 10. In evidence are the cylindrical basic shape of the basic housing body 12 with two side walls 26 which are cambered outwards, and a flattened base element 22 and a flattened ceiling element 24. The basic housing body 12 is adjoined by the terminating element 14 with the likewise cambered side walls 48. It is seen that in each case two semicircular recesses in the cable support 46 and also in the sealing cap 16 form two openings 40, 42 for inserting electric connecting cables. The terminating element 14 tapers in the direction of the side opposite the basic housing body 12. This further eases retrofitting, as conditioned by mounting, of the converter housing into corresponding ceiling openings.

Figure 4:
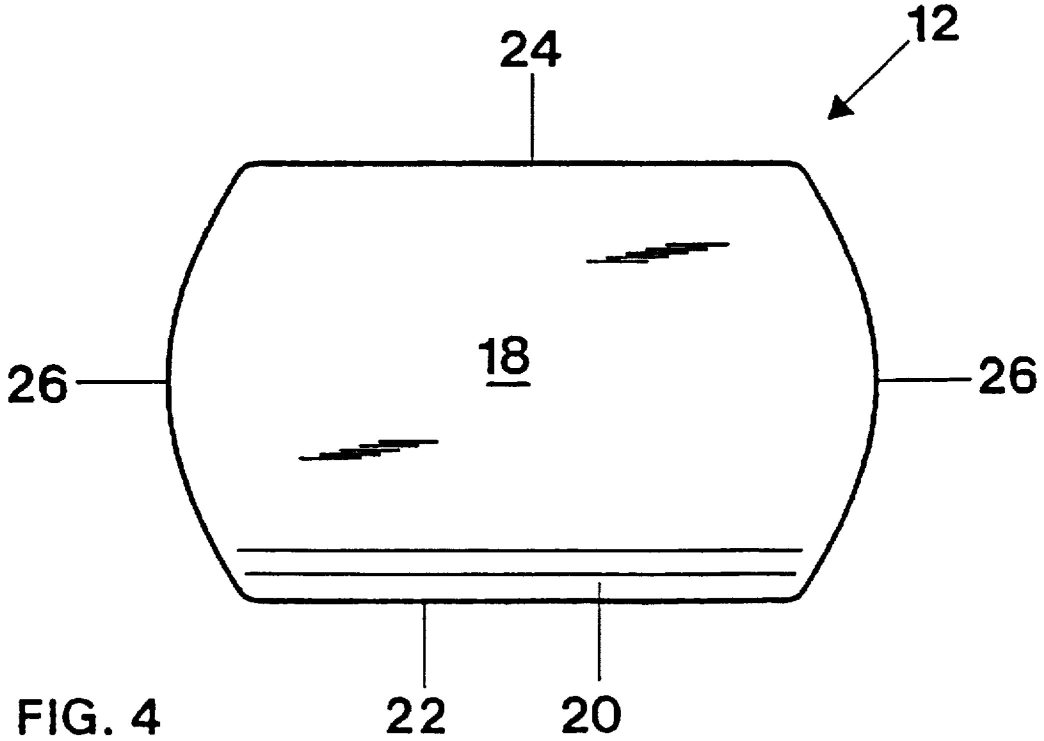
FIG. 4 shows a diagrammatically represented rear view of the converter housing according to the invention.

FIG. 4 shows a rear view of the converter housing 10. The characteristic and already described geometrical shape of the basic housing body 12 is again to be seen. In addition, it becomes clear that the basic housing body 12 is constructed rounded-off at at least one transition between the end face 18 and the base/- and base element 22, 24. This is represented in the exemplary embodiment by the transition 20 between the end face 18 and the base element 22.

It is, however, also possible for the basic housing body 12 to be constructed rounded-off at at least one transition between at least one side wall 26 of the basic housing body 12 and the base and/or ceiling element 22, 24.

Figure 5:
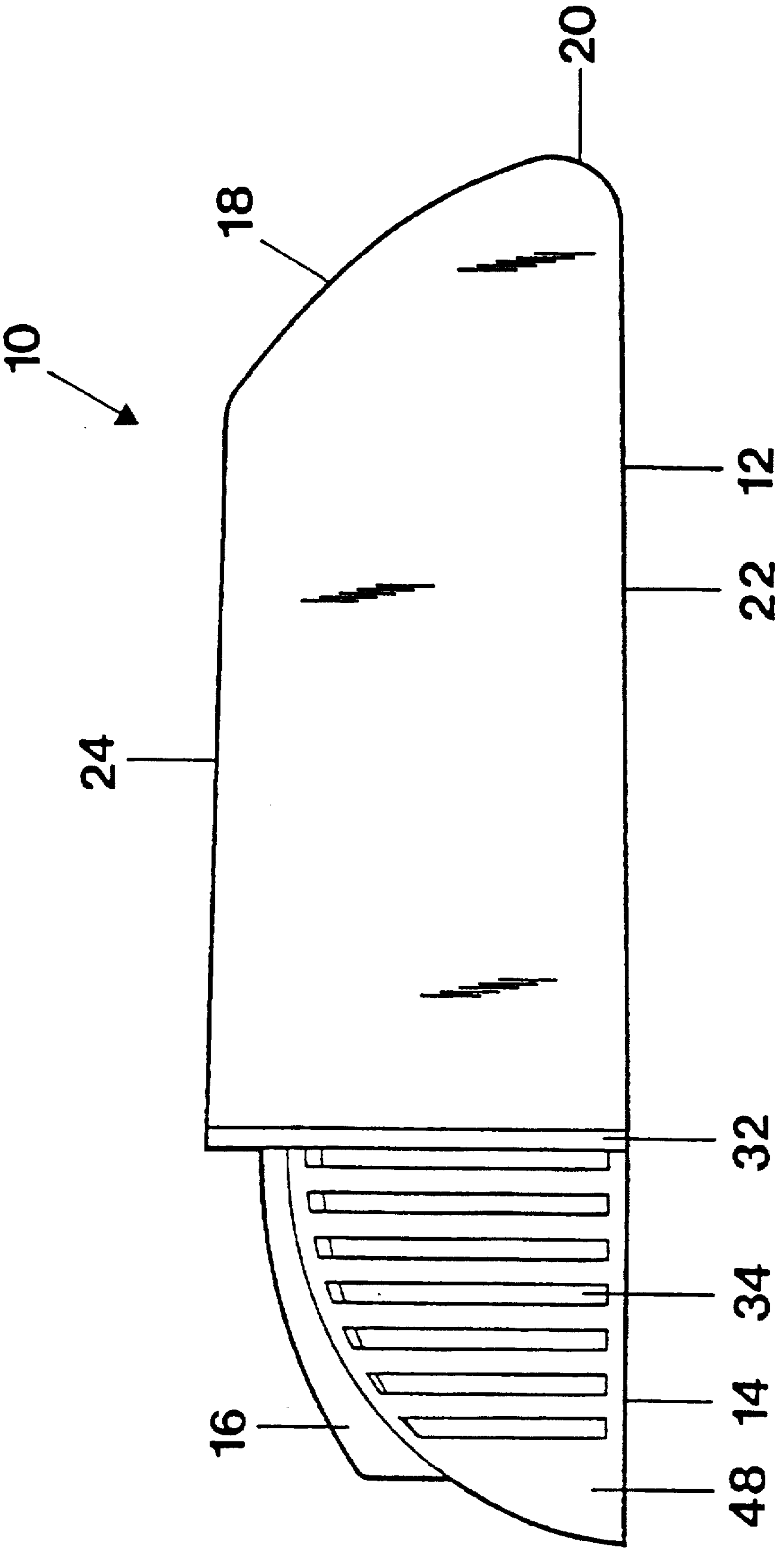
FIG. 5 shows a diagrammatically represented side view of the converter housing according to the invention.
Figure 6:
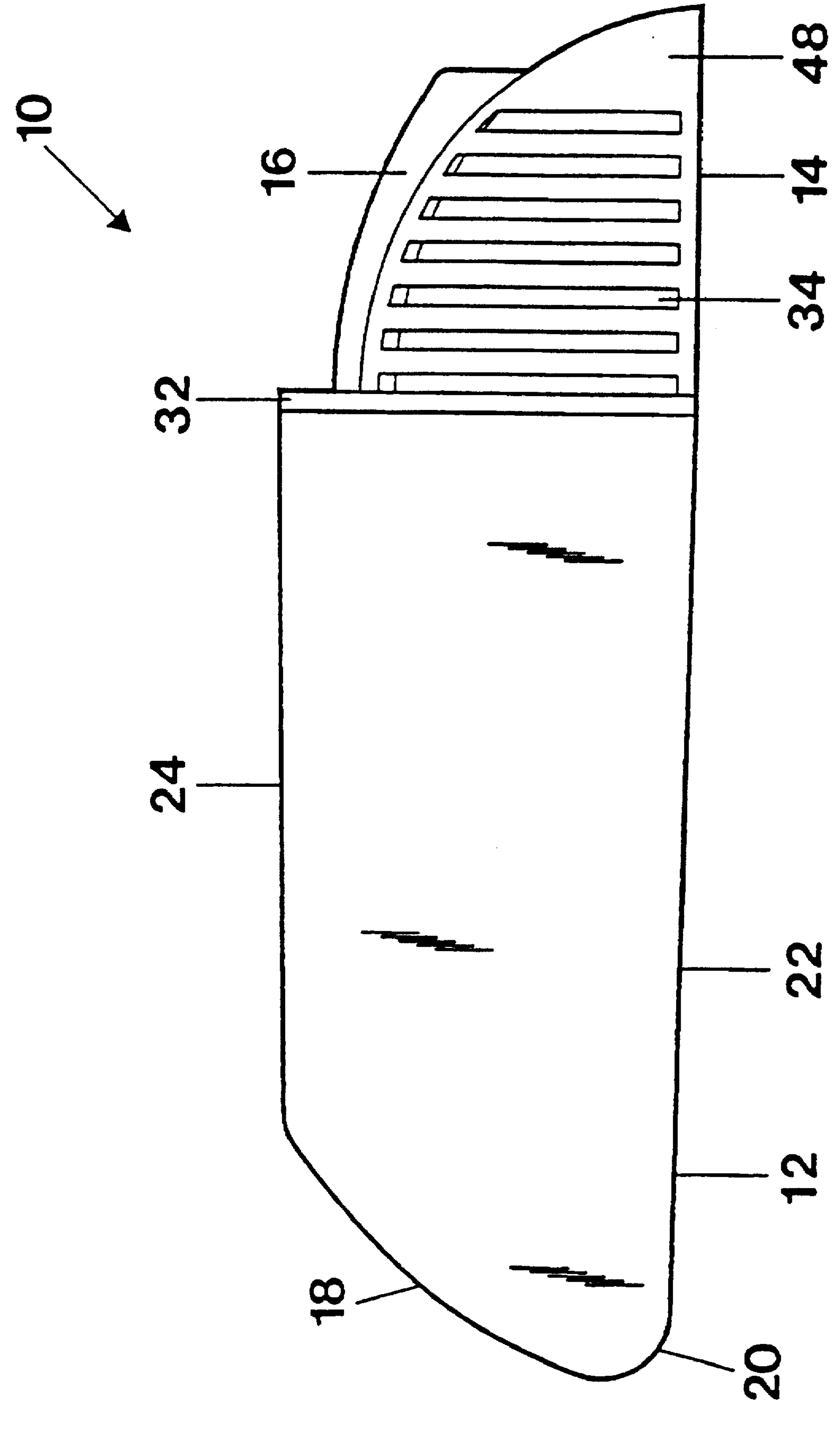
FIG. 6 shows a further diagrammatically represented side view of the converter housing according to the invention.

FIGS. 5 and 6 respectively show a side view of the converter housing 10. The geometry matched to easy mounting of the converter or of the converter housing 10 is once again in evidence. Thus, the undersides of the basic housing body 12 and of the terminating element 14 are located in a plane relative to one another, the terminating element 14 being covered by a sealing cap 16. The basic housing body once again exhibits two flattened elements 22 and 24, as well as the end face 18 rounded off towards its underside. The base element 22 is constructed rounded-off in the transition 20 between it and the end face 18.

Figure 7:
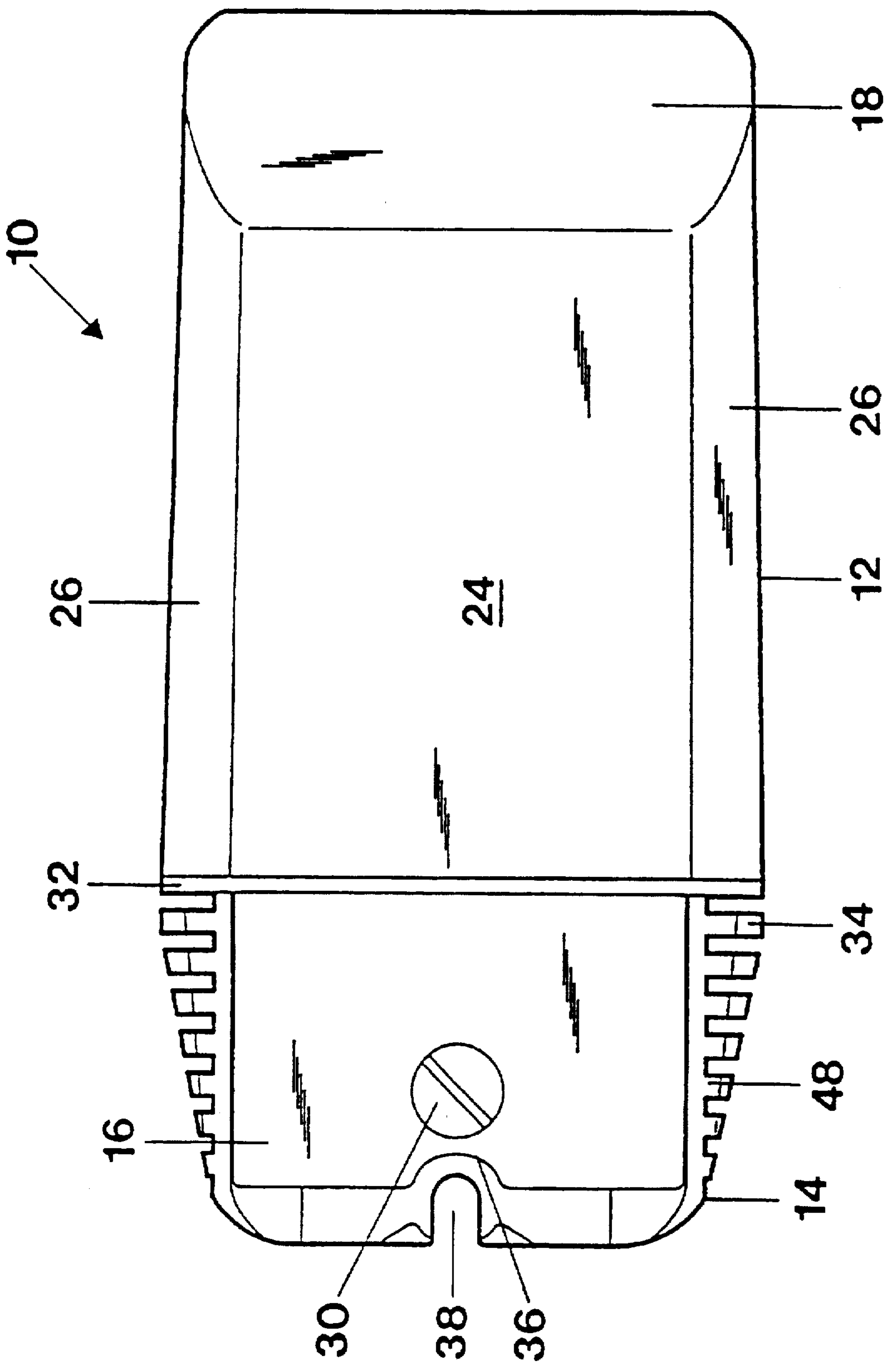
FIG. 7 shows a top view of the converter housing according to the invention.

The converter housing 10 is represented in a top view in FIG. 7. In evidence are the camber of the side walls 26 of the basic housing body 12 as well as the rounding off of the end face 18 in the direction of the underside of the basic housing body 12. It also becomes clear that the terminating element 14 tapers towards the end opposite the basic housing body 12. The recess 36 in the sealing cap 16 and the corresponding second recess 38 in the terminating element 14 serve to receive a fastening element (not represented) for fastening the entire converter housing to, for example, a ceiling of a building. The converter housing 10 can be fastened in this case before or after mounting the sealing cap 16. The fastening element 30 serves to fasten the sealing cap 16 to the terminating element 14.

Figure 8:
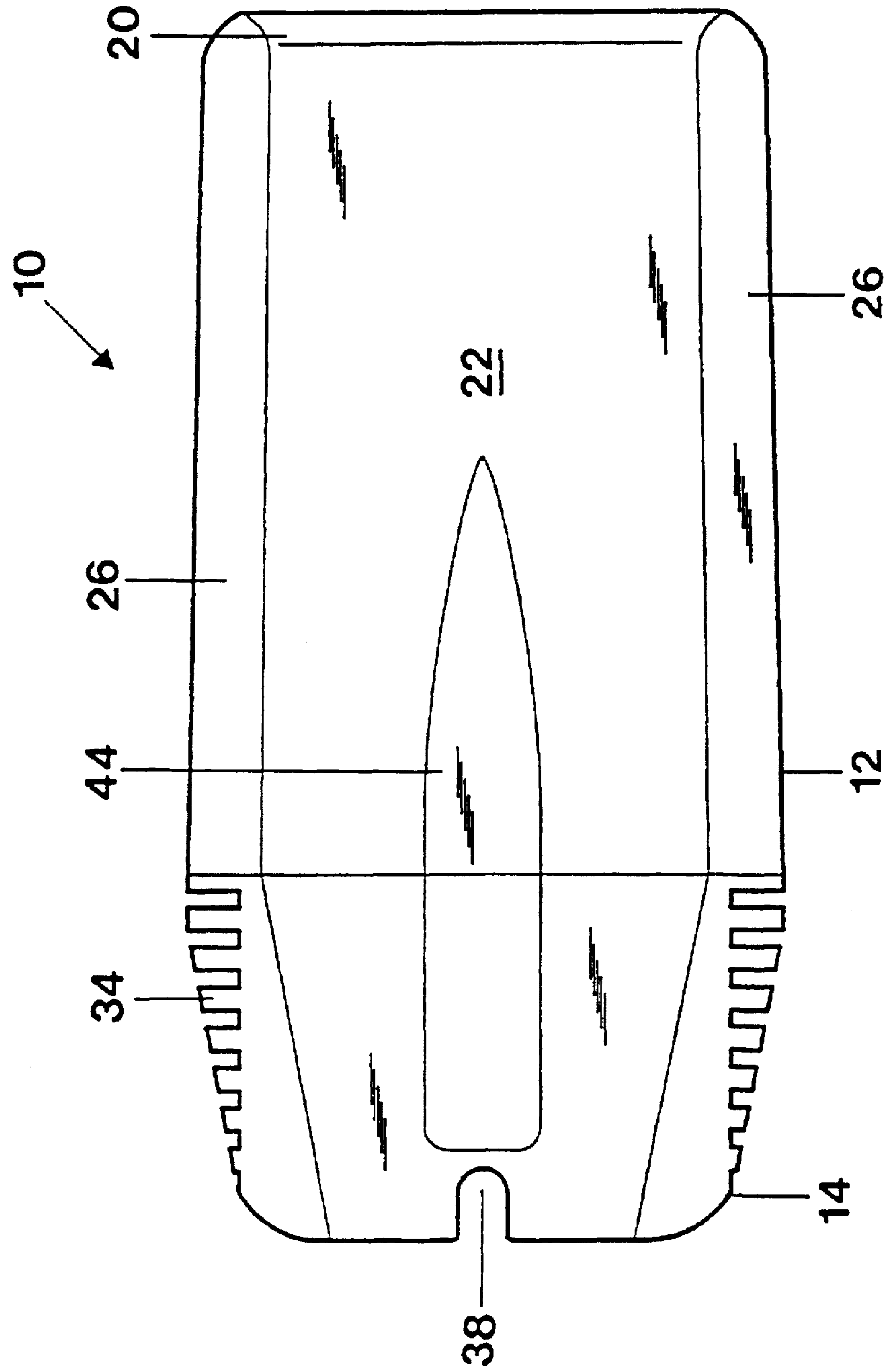
FIG. 8 shows a view of the underside of the converter housing according to the invention.

A view from below of the converter housing 10 is shown in FIG. 8. It is seen that a groove 44 is formed in the base element 22, this groove 44 extending beyond the base element 22 into the underside of the terminating element 14. The groove 44 serves to receive the supply-side connecting cable, as a result of which the mounting of the converter housing 10 or the converter is further eased.

Finally it is pointed out that the electronic components are arranged on a continuous printed circuit board in the longitudinal direction and in their greatest spatial extent in the converter housing, although this is not represented in the drawing.

What is claimed is:

1. A converter housing, in particular for an electronic converter for halogen lamps, having a basic housing body for holding electronic components, and a terminating element with a cable support for supporting at least one electric connecting cable, characterized in that the undersides of the basic housing body (12) and of the terminating element (14) are arranged in a plane and at the end opposite the terminating element (14) the basic housing body (12) has an end face (18) rounded off towards its underside, the basic housing body (12) has side walls (26) constructed cambered outwards, the terminating element (14) has side walls (48) extending from the undersides of the basic housing body (12) and has a sealing cap (16) for covering the at least one electric connecting cable disposed between the side walls (48) of the terminating element (14).

2. The converter housing according to claim 1, characterized in that the basic housing body (12) is essentially constructed profiled in the shape of a cylinder.

3. The converter housing according to claim 2, characterized in that two mutually parallel, flat surfaces are constructed as base element and ceiling element (22, 24) parallel to the cylinder axis of the basic housing body (12).

4. The converter housing according to claim 1, characterized in that at the end opposite the end face (18) the basic housing body (12) has an opening for receiving the terminating element (14).

5. The converter housing according to claim 4, characterized in that the terminating element (14) has side walls

(48) which are rounded off towards its underside and/or cambered outwards.

6. The converter housing according to claim 5, characterized in that the side walls (48) are constructed with ribs.

7. The converter housing according to claim 1, characterized in that the sealing cap (16) is rounded off in the direction of the underside of the terminating element (14) and/or is constructed with a camber.

8. The converter housing according to claim 3, characterized in that the basic housing body (12) is constructed rounded-off at at least one transition between at least one side wall (26) of the basic housing body (12) and the base and/or ceiling element (22, 24).

9. The converter housing according to claim 3, characterized in that the basic housing body (12) is constructed rounded-off at at least one transition between the end face (18) and the base and/or ceiling element (22, 24).

10. The converter housing according to claim 3, characterized in that a groove (44) is constructed in the base element (22), the groove (44) extending beyond the base element (22) into the underside of the terminating element (14).

11. The converter housing according to claim 1, characterized in that the electronic components are arranged vertically in the converter housing (10).

* * * * *